Patented May 22, 1945

2,376,817

UNITED STATES PATENT OFFICE 2,376,817

REDUCTION OF KETALDONES

Hans R. Rosenberg, Wilmington, Del., assignor to E. I. du Pont de Nemours & Company, Wilmington, Del., a corporation of Delaware No Drawing. Application September 22, 1942, Serial No. 459,303

2 Claims. (Cl. 260—397.2)

This invention relates to the reduction of carbonyl groups of oxo compounds to hydroxyl groups with metal alkoxides in the presence of an assisting agent. More particularly, it relates to the reduction of ketaldones with metal alkoxides in solution containing an assisting agent. In one of its aspects it relates to the reduction of ketosteroid compounds with a metal alkoxide in the presence of an organic nitrogen gase.

Compounds containing a carbonyl group as it appears in aldehydes or ketones have been aptly termed ketaldones in U. S. P. 2,085,750. Ketaldones in general may be reduced to hydroxy compounds by means of metal alcoholates or metal alkoxides. The yields, however, are moderate, particularly in the case of keto steroids.

An object of this invention is to provide an improved process for the reduction of ketaldones. A further object is to provide a process of reducing carbonyl groups of ketaldones to hydroxyl groups which gives increased yields. A still further object is to provide a process of reducing ketaldones in which economical and available assisting agents may be used. Another object is to provide such a process which involves simple procedural conditions and apparatus. A more specific object is to improve the yields obtained by the reaction of ketosteroid compounds with metal alcoholates. Still other objects will be apparent from the following description of the invention.

The above objects are accomplished by the present invention which in its broader aspects involves reducing a ketaldone with a metal alkoxide reducing agent which does not develop free hydrogen in the reducing process in the presence of an assisting agent. Metal alkoxides such as aluminum, magnesium, zirconium, methylates, ethylates, isopropylates, isbutylates, isoamylates, etc., which are mild reducing agents of the type specified are admixed with the ketaldone, a solvent and the assisting agent, and the reaction is allowed to proceed. The reaction mixture may be heated to accelerate the reaction.

The assisting agents found to be useful vary somewhat in constitution and properties but all appear to evidence acid binding properties in non-aqueous systems although the beneficial effects may not be attributed to such properties in the reduction procedures hereof. Among the useful assisting agents are nitrogeneous bases including ammonia, substituted ammonium hydroxides, amines, amides, and nitriles; metal salts and metal oxides. Mixtures of such agents can be used including two or more of the above types and two or more of each type, e. g., two or more amines, et cetera.

In accordance with one practical aspect of the invention ketaldones are reduced in a liquid medium with a metal alkoxide in the presence of at least one nitrogeneous base including ammonia, substituted ammonium hydroxides, organic amines, and nitriles at least until a recoverable amount of hydroxy compounds are formed.

In a further aspect of the invention the ketaldones are reduced with a metal alkoxide in the presence of at least one salt having a pH from 4 to 12 in water solution at least until a recoverable amount of a hydroxy compound is formed. The salts may thus be weakly acid, neutral and/or weakly basic and of organic or inorganic acids. In this aspect also the liquid medium is preferably an alcohol which corresponds to the metal alkoxide. A related embodiment of the invention comprises reducing ketaldones with metal alkoxide reducing agents in a liquid medium in the presence of one or more metal oxides until completion or until an economically recoverable amount of a hydroxy compound is formed.

The reduction of keto steroids by the above mentioned procedures to the corresponding hydroxides constitutes a preferred aspect of the invention. It results in increased yields over processes wherein metal alkoxides are used in the normal manner, that is, in the absence of the novel assisting agents hereof. The yields of keto steroids are in general considerably greater than when no assisting agents are used.

The improvement in yields may be demonstrated by a comparison between the results obtained with aluminum alkoxides alone and with the results obtained under the same conditions by the addition of representative assisting agents to aluminum alkoxide reduction mixtures. In the reduction of 7-oxo-cholesterol-acetate, 7-hydroxy-cholesterol is usually obtained as an amorphous solid which is difficult to purify. In the experiments forming the basis for the following table, the 7-hydroxy-cholesterol formed was not isolated as such but was esterified with benzoyl chloride and converted to the crystalline 7-hydroxy-cholesterol-dibenzoate. Hence, the yields were calculated on the conversion of 7-oxo-cholesterol-acetate to the 7-hydroxy cholesterol-dibenzoate. On the other hand, in the reduction of the other aldehydes in the table the corresponding hydroxy-compound was isolated and the yields are listed on that basis in the following table:

| Compound reduced | Added agent | Per cent yield |
|---|---|---|
| 7-oxo-cholesterol-acetate | | 56 |
| Do | Aniline | 78 |
| Do | Dimethyl aniline | 79 |
| Do | Monomethyl aniline | 77 |
| Do | Pyridine | 80 |
| Do | NaHCO$_3$ | 75 |
| Do | Na$_2$HPO$_4$ | 73 |
| Do | NaCl | 80 |
| Do | Al$_2$O$_3$ | 80 |
| Benzaldehyde | | 59 |
| Do | Pyridine | 81 |
| Cinnamic aldehyde | | 59.5 |
| Do | NaHCO$_3$ | 67.4 |
| Citronellal | | 73.5 |
| Do | NaHCO$_3$ | 84.4 |

This invention as described will be understood more readily by reference to the following examples, wherein the parts stated are parts by weight, but it is not intended that these examples shall limit the scope of the invention:

*Example I.*—Twenty-seven and six tenths (27.6) parts of 7-keto-cholesterol-acetate, melting at 159–161° C. is dissolved in a mixture of 840 parts of dry isopropanol and 42 parts of aluminum isoproproxide. The reduction is performed with continuous agitation over sixteen hours at reflux temperature, and the acetone formed during the reaction is distilled off along with a small amount of isopropanol. When the reduction is complete, as shown by a qualitative test for the absence of acetone, the reaction mixture is concentrated under vacuum (50–100 mm.). The presence of acetone is determined qualitatively by adding a few drops of the solution to be tested to a few cc.'s of an alcoholic solution of para-nitrophenyl-hydrazine to which sufficient hydrochloric acid has been added to render the solution acid to litmus. A yellow precipitate shows the presence of acetone. The residue is taken up in methylene chloride and poured onto 200 parts of ice and 500 parts of 10% hydrochloric acid. The methylene chloride extract is washed with water until neutral to litmus. The methylene chloride extract is then concentrated to a point where solid begins to separate out on cooling. The 7-hydroxy-chloesterol is not isolated at this stage, but is dissolved in 88 parts of dry pyridine with agitation and 55 parts of benzoyl chloride are added dropwise at such a rate that the solution temperature does not exceed 40° C. After agitating for twelve hours, the mixture is cooled down to 50° C. and the benzoylated product is precipitated as a white crystalline powder by adding 520 parts of methanol to the cooled mixture. The product is filtered off, washed with methanol, and dried in a vacuum oven at 70° C. for two hours. In this manner 21.4 parts (56% yield) of 7-hydroxy-cholesterol-dibenzoate, melting point 171.5–172.5° C. are obtained. By recrystallizing from an 80–20 mixture of acetone and methanol pure 7-hydroxy-cholesterol-dibenzoate, melting point 173.5–175° C. is obtained.

*Example II.*—When 27.6 parts of 7-keto-cholesterol-acetate is dissolved in 840 parts of dry isopropanol and 42 parts of aluminum isopoxide and reduced in exactly the same way as that described in Example I with the exception that 11.4 parts of dimethyl aniline is added to the reduction mixture, 30 parts (79% yield) of 7-hydroxy-cholesterol-dibenzoate is obtained.

*Example III.*—When 27.6 parts of 7-keto-cholesterol-acetate is dissolved in 840 parts of dry isopropanol and 42 parts of aluminum isopoxide and reduced in exactly the same way as that described in Example I with the exception that 7.3 parts of sodium chloride is added to the reduction mixture, 31 parts (80% yield) of 7-hydroxy-cholesterol-dibenzoate is obtained.

*Example IV.*—Twenty-seven and six tenths (27.6) parts of 7-keto-cholesterol-acetate is dissolved in 840 parts of dry isopropanol and 42 parts of aluminum isopropoxide and reduced in exactly the same manner as that described in Example I with the one exception that 12.75 parts of aluminum oxide is added to the reduction mixture. Thirty-one parts (80% yield) of 7-hydroxy-cholesterol-dibenzoate is obtained as the reaction product.

*Example V.*—One hundred and six (106) parts of benzaldehyde is dissolved in a mixture of 2400 parts of dry isopropanol and 112 parts of aluminum is propoxide. To this mixture 26 parts of pyridine is added. The reduction is performed with continuous agitation over sixteen hours at reflux temperature, and the acetone formed during the reaction is distilled off along with a small amount of isopropanol. When the reduction is complete as shown by a qualitative test for acetone as described in Example I, the reaction mixture is concentrated under reduced pressure (50–100 mm.) and 60° C. The residue is taken up in diethyl ether and poured onto 200 parts of ice and 1000 parts of 10% hydrochloric acid. The ethereal solution is freed from aluminum by washing with 10% hydrochloric acid and water. The ether extract is dried over anhydrous sodium sulfate after first washing with a saturated sodium carbonate solution and water. The dried ethereal solution is concentrated and the residue is fractionally distilled under reduced pressure (20 mm.). 89 parts of benzoyl alcohol (81% yield) are obtained.

*Example VI.*—When 106 parts of benzaldehyde is dissolved in a mixture of 2400 parts of dry isopropanol and 112 parts of aluminum isopropoxide and reduced in exactly the same way as described in Example V with the exception that no pyridine is added to the reduction mixture, 63.7 parts (59%) of benzyl alcohol is obtained.

*Example VII.*—132 parts of cinnamaldehyde is dissolved in a mixture of 235 parts of dry isopropanol and 20.4 parts of aluminum isopropoxide. To this mixture 4.7 parts of sodium bicarbonate is added. After boiling for sixteen hours, the isopropanol and acetone formed during the reaction are distilled off and the residue is taken up in ether. The reaction product is worked up as described in Example V. A yield of 67.4% of cinnamyl alcohol is obtained.

*Example VIII.*—When 132 parts of cinnamic aldehyde dissolved in a mixture of 235 parts of dry isopropanol is reduced in exactly the same way as described in Example VII with the exception that no sodium bicarbonate is added to the reduction mixture, a 59.5% yield of cinnamyl alcohol is obtained.

*Example IX.*—One hundred and fifty-four (154) parts of citronellal is dissolved in a mixture of 465 parts of isopropanol and 45 parts of aluminum isopropoxide. 9.3 parts of sodium bicarbonate is added to this mixture. After boiling for sixteen hours, the isopropanol and acetone formed during the reaction are distilled off and the residue is taken up in diethyl ether. The reaction product is worked up as described in Example V. A yield of 84.4% of citronellol is obtained.

*Example X.*—When 154 parts of citronellal is dissolved in a mixture of 465 parts of isopropanol and 45 parts of aluminum isopropoxide and reduced in exactly the same way as described in Example IX with the exception that no sodium bicarbonate is added to the reduction mixture, a yield of 73.5% of citronellol is obtained.

*Example XI.*—Twenty-seven and six tenths (27.6) parts of 7-keto-cholesterol-acetate, melting at 159–161° C., is dissolved in a mixture of 840 parts of dry isopropanol and 26 parts of aluminum isopropoxide. To this mixture two parts of benzonitrile is added. The reduction is performed with continuous agitation over sixteen hours at reflux temperature, and the isopropanol and acetone formed during the reaction are distilled off. The residue is taken up in methylene chloride and the reaction product is worked up as described in Example I. Thirty-one parts (80% yield) of 7-hydroxy-cholesterol-dibenzoate is obtained.

Although the above examples illustrate the invention in a general and practical manner, it is obvious that many modifications and equivalents may be used. In place of the aluminum isopropoxide of the foregoing examples, for instance, may be substituted various other metal alkoxide reducing agents, such as those of earth metals and rare earth metals. Suitable additional agents include the alkoxides of magnesium, zirconium, iron, antimony, tin, tellurium, titanium, scandium, yttrium and lanthanum. Mixtures of one or more of such alkoxides may be used if desired.

The metal alkoxides described above are not limited in their use to the reduction of the specific aldehydes and ketones of the above examples. On the contrary, one or more of them can be used for reducing any ketaldones including those of the aliphatic, cycloaliphatic, heterocyclic, aromatic and mixed types of low and high molecular weights. Other representative suitable aldehydes include acetaldehyde, propionaldehyde, stearaldehyde, benzoin, cyclohexanone, methylcyclohexanone, quinone, vanillin, anisaldehyde, citraldehyde, furfuraldehyde, camphor, benzophenone, morphinone, rotenone, etc.

In addition to the specific oxo compounds containing a cyclopentano-perhydro-phenanthrene nucleus mentioned in the above examples which can be similarly reduced may be mentioned 7-keto-cholesterol, 7-keto-cholesterol-benzoate, 7-keto-stigmasterol acetate, and the corresponding esters with acids such as o-nitrobenzoic, chlorobenzoic, toluic, phenylacetic, cinnamic, formic, propionic, valeric, etc. acids; cholestanone, testosterone, methyl-testosterone, androsterone, and progesterone.

The specific assisting agents chosen should not have an appreciably deleterious or destructive effect on the ketaldone treated because it is uneconomic and leads to excessive by-products. This is particularly true in the case of the keto steroid compounds.

In order to determine whether or not a specific compound is suitable as an agent to be added in the metal-alkoxide reduction of a specific ketaldone, the following test may be conducted: One gram of the ketaldone, e. g., an oxo-steroid compound is dissolved in isopropanol (about 10 cc., according to solubility) and one gram of the agent to be tested is added. The mixture is heated to reflux over a period of two hours, at the end of which the mixture is analyzed for the oxo-steroid compound employed. If the oxo-steroid compound has withstood the action of the added agent, the latter can be employed successfully in a metal alkoxide reduction of the former. A similar test can be made with other ketaldones or oxo-compounds. The analysis for the oxo-compound may be carried out according to one of the known analytical procedures for the determination of oxo-compounds. A suitable procedure involves the formation of a derivative such as the semicarbazone, oxime, et cetera.

The suitability of various agents in the reduction of 7-keto-cholesterol-acetate has been investigated and it has been found that this particular oxo-compound is quite stable to amines having a dissociation constant between approximately $10^{-7}$ and $10^{-12}$ and to inorganic salts which in 10% water solution have a pH between 5.8 and 10.8. The results of these experiments are tabulated as follows:

*Stability of 7-keto-cholesterol-acetate to organic bases*

| Base | Dissociation constant | Material recovered |
| --- | --- | --- |
| Piperazine | $k=6.4\times10^{-2}$ | 7-keto-cholesterilene. |
| Piperidine | $k=1.6\times10^{-3}$ | Do. |
| Dibutylamine | $k=4.8\times10^{-4}$ | Do. |
| Benzylamine | $k=10^{-5}$ | Do. |
| Morpholine | $k=2\times10^{-6}$ | Do. |
| Picoline | $k=3\times10^{-8}$ | 7-keto-cholesterol-acetate. |
| Dimethyl aniline | $k=1.3\times10^{-9}$ | Do. |
| Aniline | $k=4\times10^{-10}$ | Do. |
| Dimethylalphanaphthylamine. | $k=1\times10^{-11}$ | Do. |

*Stability of 7-keto-cholesterol-acetate to inorganic salts*

| Salt | pH (in n/10 water solution) | Material recovered |
| --- | --- | --- |
| Aluminum acetate | 4.93 | 7-keto-cholesterilene. |
| Sodium sulfate | 5.80 | 7-keto-cholesterol-acetate. |
| Potassium acetate | 6.72 | Do. |
| Sodium chloride | 7.00 | Do. |
| Aluminum hydroxide | 8.00 | Do. |
| Disodium phosphate | 8.26 | Do. |
| Sodium bicarbonate | 8.27 | Do. |
| Borax | 9.00 | Do. |
| Sodium carbonate | 11.00 | 7-keto-cholesterilene. |

As examples of suitable additional nitrogenous bases which can be substituted in the procedures described above, mention is made of pyridine, quinoline, alpha-naphthylamine, beta-naphthylamine, o-phenylene-diamine, o- and p-toluidine, strychnine, urea, acetamide, nicotinamide, benzamide, benzonitrile, methylcyanide, ethylcyanide, cetylcyanide, phenylacetic acid nitrile, phenyl-iso-thiocyanate, benzyl-iso-thiocyanate, cyclohexyl-iso-thiocyanate, butyl-iso-thiocyanate, hexyl-iso-thiocyanate, phenyl-thiocyanate, and benzyl-thiocyanate.

In place of the specific metal oxides of the above examples may be substituted zinc oxide, copper oxide, magnesium oxide, and similar oxides.

The reaction may be carried out over a fairly wide range of temperature and pressure conditions which, of course, vary with the particular ketaldone to be reduced. Similarly, the time of the reaction may vary over an exceedingly wide range. In general, it is preferable to carry out the reaction at elevated temperature. A practical range varies from 20 to 150° C. Temperatures in excess of the latter may be used with high molecular weight aliphatic ketaldones and others. In fact, any elevated temperature which does not decompose the reactants or products may be used.

The time may vary from a few minutes to 30 hours and more, depending on the particular reactants and temperatures selected. In the case of the oxo-steroids, a reaction time of 6 to 30 hours at temperatures from 50 to 150° C. is often necessary. On the other hand, aldehydes such as benzaldehyde, cinnamic aldehyde and citronellal require from 2 to 4 hours under similar conditions.

The proportions of assisting agents likewise may vary over a wide range. From 0.05 to 5.0 mols of agent per mol of ketaldone represents a practical range.

A wide variety of solvents can be used as the reaction medium in place of the isopropyl alcohol listed in the examples. The solvent chosen should be unreactive with the ketaldone and the reduction products thereof. Other suitable solvents include aromatic hydrocarbons, e. g., benzene, toluene, xylene; aliphatic hydrocarbons, e. g., hexane, heptane, benzene, etc.; cyclohexane, methylcyclohexane, and the like, ethers, e. g., diethyl ether, dioxane.

The improved method of reducing ketaldones to hydroxy compounds is of considerable utility in the formation of intermediates for the production of pharmaceuticals, cosmetics, perfumes, and provitamins D. To be more specific, alcohols such as citronellol, benzyl alcohol, cinnamyl alcohol, can be obtained from aldehydes and ketones in good yields by the above procedures.

The invention has the advantage that yields markedly superior to those obtained by the use of metal alkoxides alone are obtained. In some instances, almost quantitative yields are obtained.

As many apparently widely different embodiments of this invention may be made without departing from the spirit and scope thereof, it is to be understood that the invention is not to be limited except as defined by the appended claims.

I claim:

1. A process which comprises reducing a 7-ketocholesterol ester with aluminum isopropoxide in isopropanol in the presence of an organic amine having a dissociation constant between $10^{-7}$ and $10^{-12}$, and having acid-binding properties in non-aqueous systems.

2. A process which comprises reducing 7-ketocholesterol-acetate with aluminum isopropoxide in isopropanol in the presence of dimethyl aniline.

HANS R. ROSENBERG.